US007823473B2

(12) United States Patent
Uberti et al.

(10) Patent No.: US 7,823,473 B2
(45) Date of Patent: Nov. 2, 2010

(54) ELECTRO-HYDRAULIC CONTROL SYSTEM FOR A MOTOR-VEHICLE DUAL-CLUTCH TRANSMISSION

(75) Inventors: Maurizio Uberti, Turin (IT); Valter Pastorello, Turin (IT); Carlo Emilio Baret, Orbassano (IT); Gian Luigi Pregnolato, Orbassano (IT); Marco Garabello, Orbassano (IT); Dario Caenazzo, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 325 days.

(21) Appl. No.: 12/034,346

(22) Filed: Feb. 20, 2008

(65) Prior Publication Data
US 2008/0210032 A1 Sep. 4, 2008

(30) Foreign Application Priority Data
Mar. 1, 2007 (EP) ................................. 07425113

(51) Int. Cl.
*F16H 59/00* (2006.01)
(52) U.S. Cl. ....................................................... 74/335
(58) Field of Classification Search ........................ None
See application file for complete search history.

(56) References Cited
U.S. PATENT DOCUMENTS
7,073,407 B2    7/2006   Stefina 7,127,961 B2 * 10/2006 Braford et al. ................ 74/340
7,418,885 B2 *  9/2008 Muller et al. ................. 74/335
7,464,618 B2 * 12/2008 Mohlmann et al. ........... 74/346
2006/0185458 A1 *  8/2006 Gerlofs et al. ................ 74/335

FOREIGN PATENT DOCUMENTS
DE    101 25 172 A1   11/2002
EP      1 216 371 B1    6/2002
EP      1 596 104 A2   11/2005
EP      1 619 422 A1    1/2006

* cited by examiner

*Primary Examiner*—Dirk Wright
(74) *Attorney, Agent, or Firm*—Sughrue Mion, PLLC

(57) ABSTRACT

The electro-hydraulic control system comprises a gear shift control device and a hydraulic control circuit. The gear shift control device includes four shift forks, operatively associated each to a respective engagement sleeve of the transmission to cause this latter to move between first and second engagement positions, and an operating unit comprising four double-acting hydraulic actuators arranged to control each the displacement of a respective shift fork. The hydraulic control circuit comprises a supply unit, a distributor valve adapted to select every time one of the four hydraulic actuators and two solenoid valves adapted to control the hydraulic actuator selected by the distributor valve. The distributor valve has four operating positions, each of which corresponds to the selection of a respective hydraulic actuator. The two solenoid valves are arranged to be connected each to a respective pressure chamber of the hydraulic actuator selected by the distributor valve.

12 Claims, 3 Drawing Sheets

ELECTRO-HYDRAULIC CONTROL SYSTEM FOR A MOTOR-VEHICLE DUAL-CLUTCH TRANSMISSION

BACKGROUND OF THE INVENTION

The present invention generally relates to a motor-vehicle dual-clutch transmission with six or seven forward gears and reverse gear, and more specifically to an electro-hydraulic control system for a transmission of this type.

An electro-hydraulic control system for a robotized gearbox, in particular for a gearbox with six forward gears, is known from European Patent EP-B-1 216 371 and comprises eight single-acting hydraulic actuators associated in pairs to a respective shift fork and a hydraulic circuit adapted to control the supply/discharge of pressurized oil to/from the hydraulic actuators. More in particular, the hydraulic circuit comprises, according to a first embodiment, a three-way three-position solenoid valve and eight three-way two-position solenoid valves each associated to a respective hydraulic actuator. According to a second embodiment, this known hydraulic circuit comprises a three-way three-position solenoid valve, two three-way two-position solenoid valves and two distributor valves interposed between the two three-way two-position solenoid valves and the hydraulic actuators. Finally, according to a third embodiment, this known hydraulic circuit comprises two three-way three-position solenoid valves and two distributor valves interposed between the solenoid valves and the hydraulic actuators.

SUMMARY OF THE INVENTION

It is an object of the present invention to provide an electro-hydraulic control system for a motor-vehicle dual-clutch transmission with six or seven forward gears and reverse gear which has a smaller number of components than the prior art discussed above.

This and other objects are achieved in full according to the invention by virtue of an electro-hydraulic control system for a motor-vehicle dual-clutch transmission with six or seven forward gears and reverse gear as defined in independent claim 1. Further advantageous characteristics of the invention are set forth in the dependent claims.

BRIEF DESCRIPTION OF THE DRAWINGS

The characteristics and the advantages of the invention will become apparent from the following detailed description given purely by way of non-limiting example with reference to the appended drawings, in which.

DETAILED DESCRIPTION OF THE PREFERRED EMBODIMENTS

The invention will be described here below with reference to its application to a motor-vehicle dual-clutch transmission with six or seven forward gears and reverse gear, but it is however clear that it can be also applied to a motor-vehicle single-clutch transmission with six or seven forward gears and reverse gear.

Figure 1:
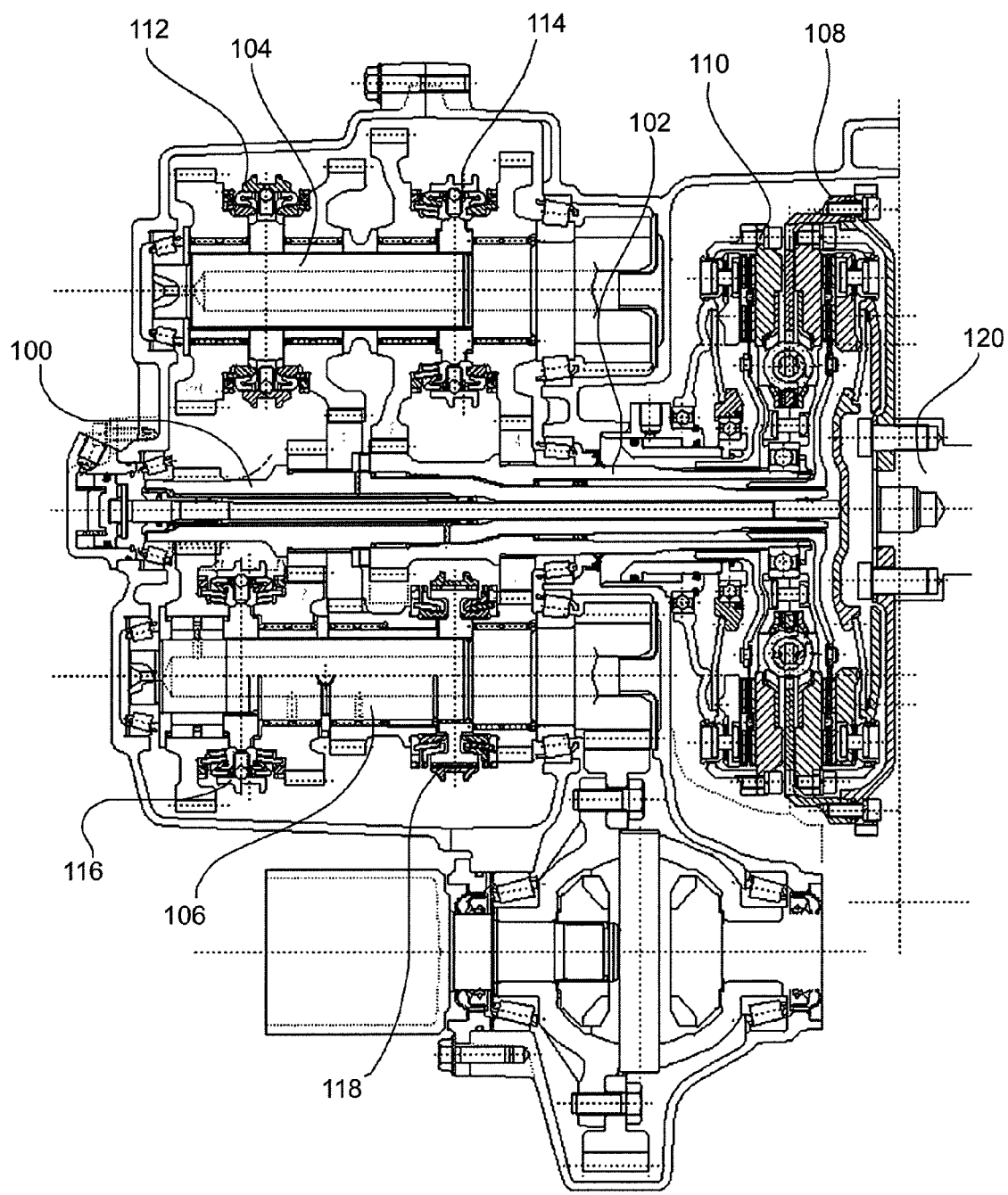
FIG. 1 is an axial section view of a motor-vehicle dual-clutch transmission with seven forward gears and reverse gear according to the prior art.

An example of a motor-vehicle dual-clutch transmission to which the electro-hydraulic control system of the invention can be applied is shown in FIG. 1, taken from European Patent Application EP-A-1619422 in the Applicant's name. The transmission shown in FIG. 1 is a dual-clutch transmission with seven forward gears and reverse gear, including first and second input shafts 100, 102, first and second output shafts 104, 106, first and second friction clutches 108, 110, each of which is operable to couple a respective input shaft with a drive shaft 120 of the motor vehicle (only partially illustrated), and four engagement sleeves 112, 114, 116, 118, each of which is associated to two idle gear wheels carried by the output shafts 104, 106.

Figure 2:
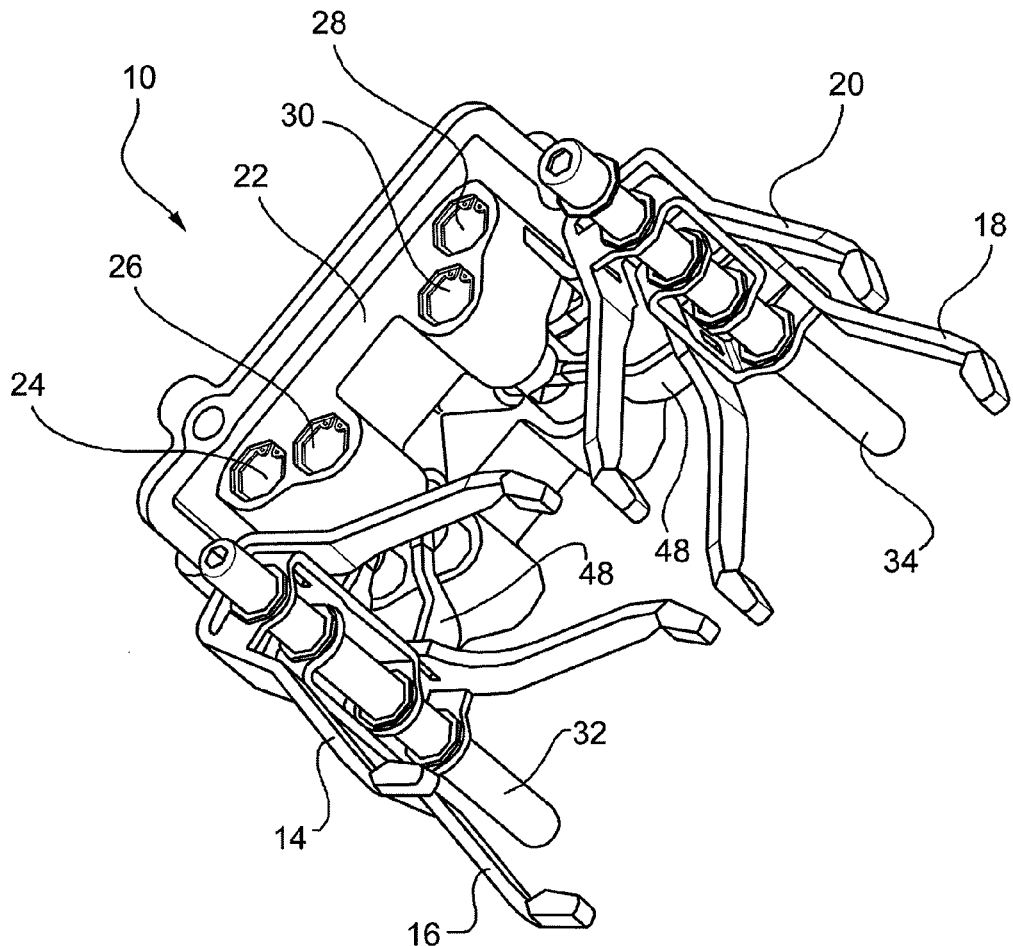
FIG. 2 is a perspective view showing a gear shift control device forming part of the electro-hydraulic control system for a motor-vehicle dual-clutch transmission with six or seven forward gears and reverse gear according to the invention.
Figure 4:
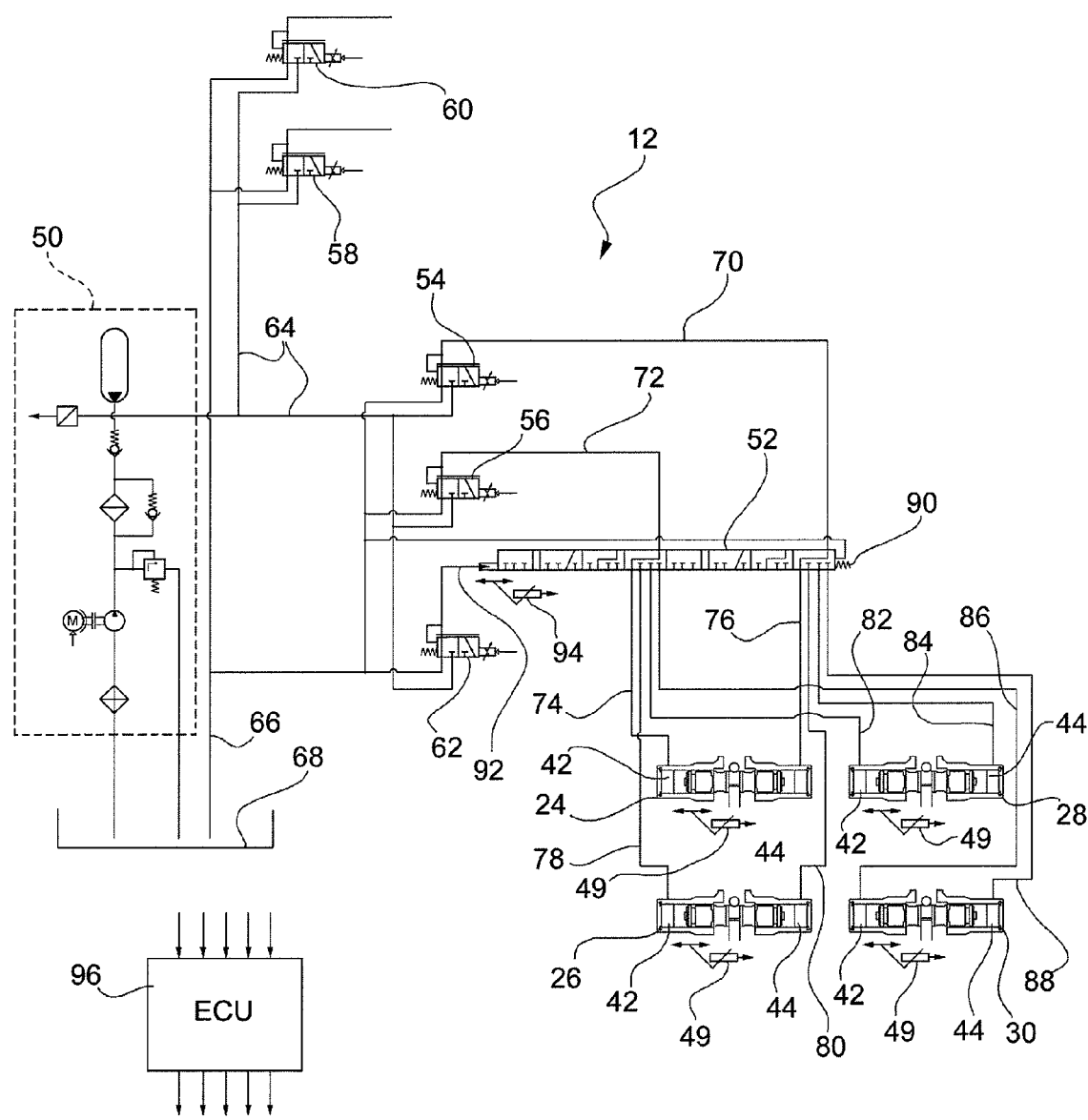
FIG. 4 is a scheme of a hydraulic control circuit forming part of the electro-hydraulic control system for a motor-vehicle dual-clutch transmission with six or seven forward gears and reverse gear according to the invention.

The electro-hydraulic control system according to the invention basically includes a gear shift control device, generally indicated 10 in FIG. 2, and a hydraulic control circuit, generally indicated 12 in FIG. 4.

The gear shift control device 10 includes four shift forks 14, 16, 18, 20, each of which is operatively associated to a respective engagement sleeve 112, 114, 116, 118 to cause this latter to move between a first engagement position, in which it couples a first idle gear wheel for rotation with the respective output shaft of the transmission, and a second engagement position, in which it couples a second idle gear wheel for rotation with the respective output shaft of the transmission, and an actuating unit 22 comprising four double-acting hydraulic actuators identical to each other, which are indicated by the reference numerals 24, 26, 28 and 30, respectively, and are each arranged to control the displacement of a respective shift fork 14, 16, 18, 20. In the exemplary embodiment illustrated in FIG. 2, the shift forks 14, 16, 18, 20 are mounted in pairs on two stationary rods 32, 34 parallel to the output shafts 104, 106 of the transmission. More specifically, the two shift forks 14 and 16 are slidably mounted on the rod 32, while the other two shift forks 18 and 20 are slidably mounted on the rod 34. The shift forks 14, 16, 18, 20 illustrated in FIG. 2 are advantageously formed according to the teaching of non-published European Patent Application N. 06425148.1 by the Applicant, that is to say, with identical bodies suitably shaped to allow each pair of shift forks mounted on the same rod to be disposed so as to partially overlap. It is however clear that the shift forks may have any other shape.

Figure 3:
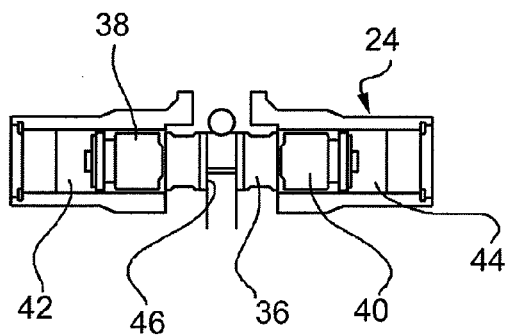
FIG. 3 is a simplified axial section view of a double-acting hydraulic actuator of the gear shift control device of FIG. 2.

As schematically illustrated in FIG. 3, each hydraulic actuator (reference numeral 24 is used in this figure to indicate the whole hydraulic actuator, but it is to be understood that the following description relating to the actuator 24 also applies to the remaining actuators 26, 28 and 30) includes a plunger 36 forming at the opposite ends first and second head portions 38 and 40, which are slidably and fluid-tightly arranged in first and second pressure chambers 42 and 44, respectively. In its intermediate region between the head portions 38 and 40, the plunger 36 has a recess 46 on its cylindrical lateral surface in which a nose 48 (FIG. 2) of a respective shift fork 14, 16, 18, 20 associated to the actuator engages, whereby the translational movement of each hydraulic actuator is transmitted to the associated shift fork. The recesses 46 of the plungers 36 of the four hydraulic actuators 24, 26, 28, 30 are preferably disposed in a single plane in the intermediate neutral position between the two engagement positions. As can be seen in FIG. 4, each hydraulic actuator 24, 26, 28, 30 further includes a position sensor 49 (only indicated by a symbol in FIG. 4) adapted to provide an electronic control unit 96 with a position signal for position feedback control of the actuator itself.

The hydraulic control circuit 12 arranged to control the hydraulic actuators 24, 26, 28, 30 of the gear shift control device 10 so as to shift every time from one gear to the other, depending on the commands imparted directly by the driver or by an electronic control unit of the transmission, and to control hydraulic actuating means (not shown), for example two further hydraulic actuators, adapted to control the friction clutches 108, 110, will be described now with reference to FIG. 4.

The control circuit 12 comprises a supply unit, generally indicated 50, a four-position distributor valve 52 (hereinafter referred to as selection distributor valve) for selecting every time one of the four hydraulic actuators 24, 26, 28, 30, a first pair of three-way two-position pressure proportional solenoid valves 54, 56 (hereinafter referred to as actuator control solenoid valves) for controlling the hydraulic actuator selected from time to time by the selection distributor valve 52, a second pair of three-way two-position proportional solenoid valves 58, 60 (hereinafter referred to as clutch control solenoid valves) for controlling each a respective friction clutch 108, 110 of the transmission, and a further three-way two-position pressure proportional solenoid valve 62 (hereinafter referred to as pilot solenoid valve) for controlling the displacement of the selection distributor valve 52 among its four reachable positions. The expression "selecting an actuator" used above is to be intended in the following description and claims as putting the two pressure chambers of that given actuator in such conditions as to be connected to the supply unit via the two actuator control solenoid valves 54, 56.

In the example illustrated in FIG. 4, the two clutch control solenoid valves 58 and 60 are a flow-rate proportional solenoid valve and a pressure proportional solenoid valve, respectively. However, the solenoid valve 58 might alternatively be a pressure proportional solenoid valve. Moreover, the pilot solenoid valve 62 is represented as a pressure proportional solenoid valve, but might alternatively be a flow-rate proportional solenoid valve. Also the actuator control solenoid valves 54, 56 might be flow-rate proportional solenoid valves, instead of pressure proportional solenoid valves.

The control circuit 12 further comprises a supply line 64 and a discharge line 66, through which the five solenoid valves 54, 56, 58, 60, 62 are connected to the supply unit 50 and to a tank 68, respectively. The two actuator control solenoid valves 54, 56 are each connected to a respective input port of the selection distributor valve 52 through a respective line 70, 72. The pressure chambers 42 and 44 of the first hydraulic actuator 24 are connected to a first pairs of output ports of the selection distributor valve 52 through a pair of lines 74, 76, respectively. The pressure chambers 42 and 44 of the second hydraulic actuator 26 are connected to a second pair of output ports of the selection distributor valve 52 through a pair of lines 78, 80, respectively. The pressure chambers 42 e 44 of the third hydraulic actuator 28 are connected to a third pair of output ports of the selection distributor valve 52 through a pair of lines 82, 84, respectively. The pressure chambers 42 and 44 of the fourth hydraulic actuator 30 are connected to a fourth pair of output ports of the selection distributor valve 52 through a pair of lines 86, 88, respectively.

The selection distributor valve 52 is held in a first position by a spring 90 and can be moved to the other three positions by the pilot solenoid valve 62 through a pilot line 92. The selection distributor valve 52 includes a position sensor 94 (only indicated by a symbol), or alternatively a pressure transducer, for position- (or pressure-) control of the distributor itself. In each of the four positions of the selection distributor valve 52 the two input ports of the distributor valve, which are connected to the two actuator control solenoid valves 54 and 56 through the lines 70 and 72, are put into communication every time with two output ports of the distributor valve which are connected to a respective hydraulic actuator. In particular, the rest position of the selection distributor valve 52, which is held by the spring 90, corresponds to the condition of selection of the hydraulic actuator 24, in which the lines 70 and 72 are put into communication with the lines 74 and 76, respectively, and therefore the actuator control solenoid valves 54 and 56 are capable of supplying or venting the pressure chambers 42 and 44 of the hydraulic actuator 24 to position the associated shift fork 14 in either one of the engagement positions or in the neutral position. The adjacent position of the selection distributor valve 52 corresponds to the condition of selection of the hydraulic actuator 26, in which the lines 70 and 72 are put into communication with the lines 78 and 80, respectively, and therefore the actuator control solenoid valves 54 and 56 are capable of supplying or venting the pressure chambers 42 and 44 of the hydraulic actuator 26 to position the associated shift fork 16 in either one of the engagement positions or in the neutral position. The next position of the selection distributor valve 52 corresponds to the condition of selection of the hydraulic actuator 28, in which the lines 70 and 72 are put into communication with the lines 82 and 84, respectively, and therefore the actuator control solenoid valves 54 and 56 are capable of supplying or venting the pressure chambers 42 and 44 of the hydraulic actuator 28 to position the associated shift fork 18 in either one of the engagement positions or in the neutral position. Finally, the position of the selection distributor valve 52 opposite the rest position corresponds to the condition of selection of the hydraulic actuator 30, in which the lines 70 and 72 are put into communication with the lines 86 and 88, respectively, and therefore the actuator control solenoid valves 54 and 56 are capable of supplying or venting the pressure chambers 42 and 44 of the hydraulic actuator 30 to position the associated shift fork 20 in either one of the engagement positions or in the neutral position. This latter position of the selection distributor valve 52 can be obtained with the maximum pressure in the pilot line 92 and by mechanical end stop of the selection distributor valve itself.

The solenoid valves 54, 56, 58, 60, 62 of the hydraulic circuit 12 are feedback controlled by the electronic control unit 96, which receives as inputs measure signals from the position sensors 49 of the hydraulic actuators 24, 26, 28, 30 and from the position sensor (or from the pressure transducer) 94 of the selection distributor valve 52 and sends as outputs control signals to the solenoid valves.

In the light of the preceding description the advantages offered by the electro-hydraulic control system according to the present invention will clearly result.

First of all, the use of only four hydraulic actuators on the one hand and of a selection distributor valve along with two solenoid valves for controlling the hydraulic actuators on the other makes it possible to minimize the number of components of the control system.

Secondly, the hydraulic actuators are identical to each other and can be controlled independently of each other, which makes it possible to bring about gear changes in non-sequential way and in "power-shift" mode, i.e. with simultaneous engagement of two gears.

Finally, as already stated above, the same electro-hydraulic control system can be also used for a robotized single-clutch transmission with six or seven forward gears and reverse gear, by simply removing one of the two friction clutch control solenoid valves, in particular the solenoid valve 60.

Naturally, the principle of the invention remaining unchanged, the embodiments and constructional details may vary widely with respect to those described and illustrated purely by way of non-limiting example.

What is claimed is:

1. An electro-hydraulic control system for a motor-vehicle dual-clutch transmission with six or seven forward gears and reverse gear, comprising a hydraulic control circuit and a gear shift control device including four shift forks, each operatively associated to a respective engagement sleeve of the transmission to cause this latter to move between first and second engagement positions through an intermediate neutral position, and an actuating unit comprising four double-acting hydraulic actuators arranged to control each the displacement of a respective shift fork,
    wherein the hydraulic control circuit comprises a supply unit, a distributor valve for selecting every time one of the four hydraulic actuators, a pilot solenoid valve for controlling the distributor valve, and two first solenoid valves for controlling the hydraulic actuator selected by the distributor valve, and
    wherein the distributor valve is a four-position distributor valve and wherein each of the positions of the distributor valve corresponds to the selection of one of the four hydraulic actuators.

2. A control system according to claim 1, wherein said first solenoid valves are three-way two-position proportional solenoid valves.

3. A control system according to claim 1, wherein the pilot solenoid valve is a three-way two-position proportional solenoid valve.

4. A control system according to claim 1, wherein each of the hydraulic actuators includes first and second pressure chambers and a plunger forming at its opposite ends first and second head portions slidably and fluid-tightly arranged in said first and second pressure chambers, respectively, and wherein said first solenoid valves are arranged to be connected each with a respective pressure chamber of the selected hydraulic actuator.

5. A control system according to claim 1, further comprising first position sensor means, each of which is associated to a respective hydraulic actuator to generate a first measure signal indicative of the position of the actuator, and second position sensor means associated to the distributor valve to generate a second measure signal indicative of the position of the distributor valve.

6. A control system according to claim 1, further comprising an electronic control unit for generating suitable control signals and to send them to the solenoid valves.

7. A control system according to claims 5, further comprising an electronic control unit for generating suitable control signals and to send them to the solenoid valves, wherein the electronic control unit is arranged to receive said first and second measure signals and to position-feedback control the solenoid valves and the distributor valve based on said first and second measure signals.

8. A control system according to claim 1, wherein the hydraulic control circuit further comprises two second solenoid valves for controlling each a respective friction clutch of the transmission.

9. A control system according to claim 8, wherein said second solenoid valves are three-way two-position proportional solenoid valves.

10. An electro-hydraulic control system for a motor-vehicle dual-clutch transmission with six or seven forward gears and reverse gear, comprising a hydraulic control circuit and a gear shift control device including four shift forks, each operatively associated to a respective engagement sleeve of the transmission to cause this latter to move between first and second engagement positions through an intermediate neutral position, and an actuating unit comprising four double-acting hydraulic actuators arranged to control each the displacement of a respective shift fork,
    wherein the hydraulic control circuit comprises a supply unit, a distributor valve for selecting every time one of the four hydraulic actuators, a pilot solenoid valve for controlling the distributor valve, and two first solenoid valves for controlling the hydraulic actuator selected by the distributor valve, and
    wherein the electro-hydraulic control system further comprises first position sensor means, each of which is associated to a respective hydraulic actuator to generate a first measure signal indicative of the position of the actuator, and second position sensor means associated to the distributor valve to generate a second measure signal indicative of the position of the distributor valve.

11. A control system according to claim 10, further comprising an electronic control unit for generating suitable control signals and to send them to the solenoid valves.

12. A control system according to claims 11, wherein the electronic control unit is arranged to receive said first and second measure signals and to position-feedback control the solenoid valves and the distributor valve based on said first and second measure signals.

* * * * *